No. 608,839. Patented Aug. 9, 1898.
J. P. DALY.
BICYCLE TIRE SHIELD.
(Application filed Mar. 13, 1897.)
(No Model.)
Fig. 1.
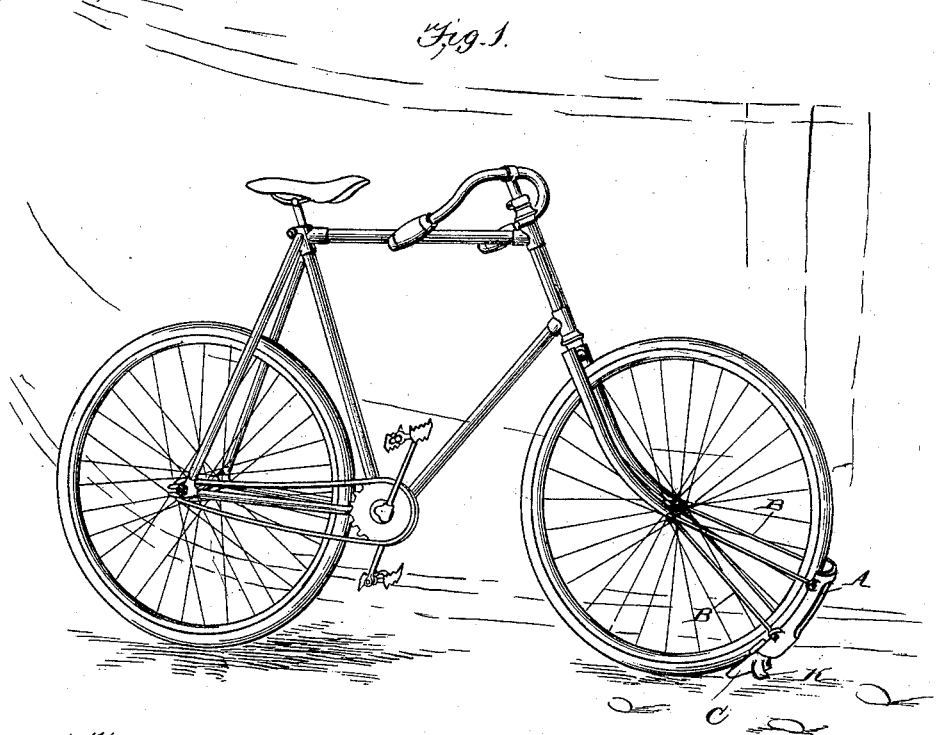
Fig. 2.
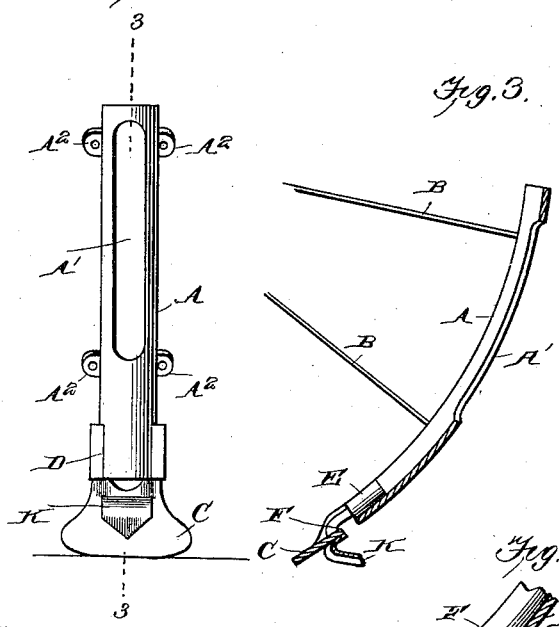
Fig. 3.
Fig. 4.
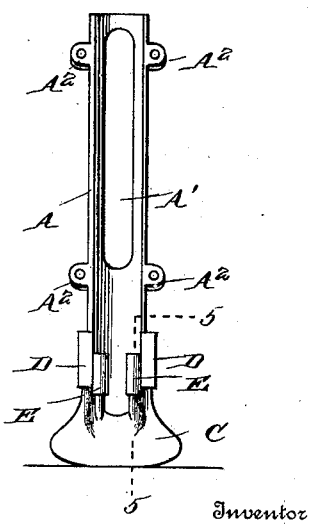
Fig. 5.
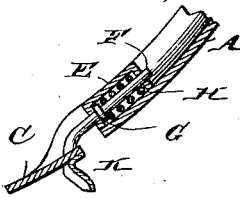
Witnesses
J. C. Shaw
Chas. E. Brock
Inventor
John P. Daly,
By Onward & Co.
Attorneys

UNITED STATES PATENT OFFICE.

JOHN P. DALY, OF SAVANNAH, GEORGIA.

BICYCLE-TIRE SHIELD.

SPECIFICATION forming part of Letters Patent No. 608,839, dated August 9, 1898.

Application filed March 13, 1897. Serial No. 627,360. (No model.)

*To all whom it may concern:*

Be it known that I, JOHN P. DALY, residing at Savannah, in the county of Chatham and State of Georgia, have invented a new and useful Bicycle-Tire Shield, of which the following is a specification.

This invention is a device for protecting the pneumatic tire of a bicycle, the object of the invention being to provide an attachment carried in advance of the front wheel adapted to sweep all obstacles from the path of the tire.

Another object is to provide the attachment of the pilot or fender for turning aside the larger obstacles.

With these various objects in view my invention consists, essentially, of a curved plate arranged in advance of the front wheel and supported upon the front axle, said plate carrying a spring-actuated sweep device at the lower end, which contacts with the ground directly in advance of the tire, said sweep device being provided with a pilot to cast aside the larger obstacles.

The invention consists also in certain details of construction and novelties of combination, all of which will be fully described hereinafter and pointed out in the claims.

In the drawings forming a part of this specification, Figure 1 is a view showing the device applied to a bicycle. Fig. 2 is a front view. Fig. 3 is a detail section on the line 3 3 of Fig. 2. Fig. 4 is a rear or inner side view. Fig. 5 is a section on the line 5 5 of Fig. 4.

In carrying out my invention I employ a curved plate A, which is cut away at A' for the purpose of lightness, and it is also provided with integral ears A² near the upper and lower ends, and to which the supporting-rods B are attached, said supporting-rods being rigidly attached to the ends of the front axle, and thereby supporting the plate A concentric with the tire adjacent thereto and close to the ground.

At the lower end of the plate A is arranged a sweep device C, which is made broadest at its lower end, which lower end is adapted to contact with the earth and clear the path of all obstacles.

In order to connect the sweep C to the plate A, I provide the guides D, in which the upper edges of the sweep C slide, and adjacent to the guides D are arranged the sleeves E, within which work the rods F, carried by the sweep C, said rods having a collar G rigid therewith, and within the sleeve E and bearing upon the collar G is arranged the coiled spring H, the purpose of which is to keep the sweep C normally in its lowest position, so that it will contact with the ground.

This construction also permits the sweep to spring upward when the wheel is rolled backward, thereby preventing said sleeve from plowing into the earth.

The pilot K is rigidly attached to the forward side of the sweep C by its upper end, the lower end of said pilot projecting in front of the sweep C and a little above the ground and is adapted to cast the larger obstacles—such as stones, &c.—away from the sweep C, said sweep being only intended to clear the path of the smaller obstacles, such as pieces of glass, tacks, and the like.

It will thus be seen that I provide an exceedingly cheap and simple device which can be quickly and easily applied to any of the bicycles now in use, and one which will effectively clear the path in advance of the front wheel, thereby preventing pointed objects—such as pieces of glass, tacks, &c.—coming in contact with the pneumatic tire.

Having thus described my invention, what I claim as new, and desire to secure by Letters Patent, is—

1. In a bicycle attachment, the combination with the curved plate and supporting-arms, of the sweep device, the guides and sleeves carried by the curved plate, connecting-rods having collars, and the coiled spring arranged within the sleeves and bearing upon the collars, all arranged and adapted to operate substantially as shown and described.

2. In a bicycle attachment, the combination with the curved plate and supporting-arms, of the sweep device, the guides and sleeves carried by the curved plate, connecting-rods having collars, and the coiled spring arranged within the sleeves and bearing upon the collars, and the pilot carried upon the forward face of the sweep device, all arranged and adapted to operate substantially as shown and described.

JOHN P. DALY.

Witnesses:
CHAS. R. SMITH,
E. S. O'BRIEN, Jr.